J. WORRALL.
Refrigerator.
No. 56,154.
Patented July 3, 1866.
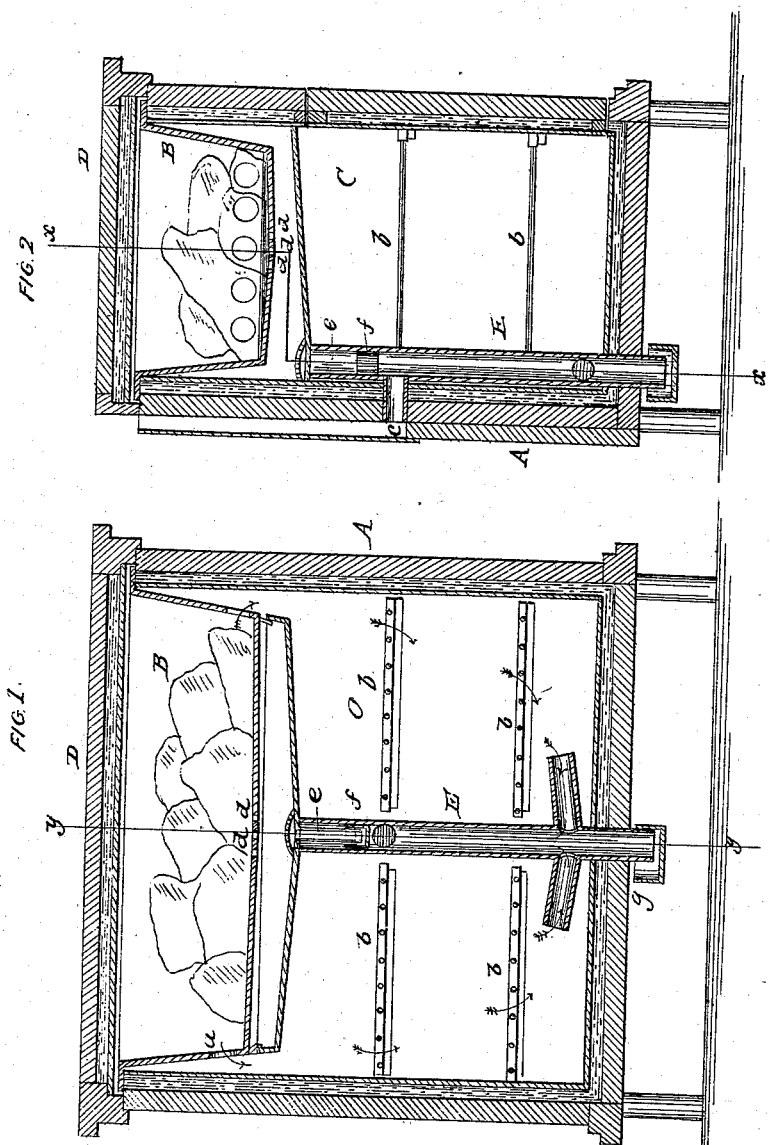

UNITED STATES PATENT OFFICE.

JOHN WORRALL, OF NEW HAVEN, CONNECTICUT, ASSIGNOR TO HIMSELF AND JESSE CUDWORTH, OF SAME PLACE.

IMPROVED REFRIGERATOR.

Specification forming part of Letters Patent No. 56,154, dated July 3, 1866.

*To all whom it may concern:*

Be it known that I, JOHN WORRALL, of the city and county of New Haven, and State of Connecticut, have invented a new and Improved Refrigerator; and I do hereby declare that the following is a full, clear, and exact description thereof, which will enable others skilled in the art to make and use the same, reference being had to the accompanying drawings, forming part of this specification, in which—

Figure 1 represents a longitudinal vertical section of this invention, taken in the plane indicated by the line $x\ x$, Fig. 2. Fig. 2 is a transverse vertical section of the same, the plane of section being indicated by the line $y\ y$, Fig. 1.

Similar letters of reference indicate like parts.

This invention relates to a refrigerator in which the outward air enters the ice-chamber through a loosely-fitting cover, and after having been cooled it passes out through apertures in the sides of the ice-chamber directly into the provision-chamber. The warm air from the provision-chamber rises through a tube in the interior and out through the exhaust-pipe at the back of the provision-chamber, and it is prevented from passing up into the ice-chamber by means of a water-trap secured in the interior of the tube, through which the air rises, and which also serves to carry off the waste-water.

A represents a refrigerator-box, made of wood or any other suitable material, and lined with a stratum of plaster-paris and a layer of sheet-zinc or galvanized sheet-iron. This box is divided in two compartments, B C, one of which forms the ice-chamber and the other the provision-chamber.

The ice-chamber B occupies the upper part of the box A, and access is had to it by means of a cover, D, which is put on loosely or in such a manner that the external air is not entirely excluded. The air which enters the ice-chamber is cooled by coming in contact with the ice, and it passes through holes $a$ in the ends of said ice-chamber down into the provision-chamber C, where it comes in contact with the provisions or other articles placed on the shelves $b$. The warm air from the provision-chamber passes up through the tube E, and it escapes through the exhaust-pipe $c$ at the back of the box A.

The water resulting from the melting of the ice in the ice-chamber passes down through holes $d$ into the pipe $e$, which extends through the center of the tube E and terminates in the water-trap $f$. By this trap the air from the provision-chamber is prevented from passing up into the ice-chamber, and all bad smell which would result therefrom is avoided. The water, after leaving the trap $f$, passes down through the tube F and fills the trap $g$ at the bottom end of said tube, whereby the entrance of the external air into the provision-chamber is avoided.

It will be noticed that by this arrangement the air from the ice-chamber passes directly into the provision-chamber, no intermediate pan or box being required, and the water dripping from the ice-chamber collects immediately in the pipe $e$, the false bottom under the ice-chamber being required only in case the real bottom should become leaky. Furthermore, fresh air is continually introduced in the provision-chamber, and the air escaping from said chamber is prevented from mingling with the air in the ice-chamber or from returning into said chamber, so that all disagreeable odors are avoided and the provisions remain fresh for a long time.

My refrigerator is easily constructed. It is cheap, not liable to get out of order, and very economical in regard to consumption of ice.

What I claim as new, and desire to secure by Letters Patent, is—

1. The closely-fitting ice-chamber B, with apertures $a$ in its ends, in combination with the provision-chamber C, tube E, and water-pipe $e$, constructed and operating substantially as and for the purpose described.

2. The water-trap $f$ in the interior of the tube E, in combination with the ice-chamber B and provision-chamber C, constructed and operating substantially as and for the purpose set forth.

JOHN WORRALL.

Witnesses:
J. J. RICHARDSON,
J. HEATON.